United States Patent Office 3,415,876
Patented Dec. 10, 1968

3,415,876
PROCESS FOR NITRATING AROMATIC COMPOUNDS IN LIQUID SULFUR DIOXIDE
Harm J. Boonstra and Johan T. Semeyns de Vries van Doesburgh, Geleen, Johannes J. M. Deumens, Nuth, and Hubertus J. A. Delahaye, Voerendaal, Netherlands, assignors to Stamicarbon N.V., Heerlen, Netherlands
No Drawing. Filed Feb. 3, 1967, Ser. No. 613,732
Claims priority, application Netherlands, Feb. 3, 1966, 6601366
8 Claims. (Cl. 260—515)

ABSTRACT OF THE DISCLOSURE

A process for nitrating aromatic compounds is described wherein the reaction is carried out in liquid sulfur dioxide.

Brief summary of the invention

The present invention relates to the preparation of nitro derivatives of aromatic compounds by reacting an aromatic compound with a nitrating reagent and provides that the reaction is carried out in liquid sulfur dioxide.

Nitro derivatives of armatic compounds are here to be understood to mean nuclear-nitrated aromatic compounds with at least one $NO_2$-group bound to the aromatic nucleus.

Examples of nitrating reagents used in this invention include mixtures of nitric acid and sulfuric acid, mixtures of nitric acid and oleum, mixtures of nitrogen tetroxide and boron trifluoride and the like.

General description of the invention

Although it has been carried out for many years on an industrial scale, the nitration of aromatic compounds is still a difficult and costly process. The use of aggressive reagents in a reaction medium in which violent exothermic decomposition reactions may take place, calls for great care, while in various other cases, a large excess of the nitrating reagent or of one or more components thereof is required. As a result, large amounts of so-called spent acid are obtained, which are difficult to process.

The present invention provides a very simple process for the nitration of aromatic compounds which offers considerable advantages as compared with presently known techniques.

The process according to the invention is characterized in that the aromatic compound is reacted with the nitrating reagent in a medium composed of liquid sulfur dioxide.

The process according to this invention renders it possible for the reaction heat released during the nitration to be completely or partly carried off by evaporation of sulfur dioxide, as a result of which a very good control of the temperature of the reaction mixture can be achieved. This feature is of very great importance to prevent violent exothermic decomposition reactions. When the heat of the reaction is removed in this way, the sulfur dioxide content of the reaction mixture can be maintained at the required level by reflux cooling. Upon completion of the nitration reaction, the sulfur dioxide medium can then be recovered almost quantitatively, simply by a evaporation and condensation of the same.

Using liquid sulfur dioxide as the reaction medium in the nitration has the further advantage that it is possible to utilize a reaction mixture with a viscosity which is considerably lower than that of the reaction media generally present in known nitration processes, under otherwise identical conditions. Owing to this favorable effect of lowering the viscosity of the reaction mixture, better mixing and, consequently, a more rapid conversion can be achieved. Furthermore, the nitration can be carried out at a lower temperature, permitting increases in the selectivity of the nitration reaction. This feature is a great advantage in cases of thermally less stable reaction mixtures.

An additional advantage of conducting the nitration reaction in the liquid sulfur dioxide medium is that any excesses of the nitrating reagent or of one or more of the components thereof, as may be required to make the reaction proceed to a satisfactory end point, may be much smaller than in the conventional nitration processes. As a result, a smaller amount of spent acid is obtained.

Finally, the process according to the invention also makes it possible to obtain larger yields of the desired nitro compound, and in a higher degree of purity. If, for instance, metanitrobenzoic acid is prepared in accordance with this invention, by nitration of benzoic acid in a medium of liquid sulfur dioxide, it appears that after a single recrystallization of the raw nitration product, a high yield of completely pure metanitrobenzoic acid can be obtained. In the process for the nitration of benzoic acid which is thus far customary (see K. E. Cooper and C. K. Ingold, Journal of the Chemical Society, 1927, page 836), a raw reaction product is obtained which contains about 20% of orthonitrobenzoic acid and about 1% of paranitrobenzoic acid as by-products to the formation of metanitrobenzoic acid. Pure metanitrobenzoic acid can be separated from this reaction product only by repeated recrystallization and at the cost of a large decrease of the yield of the acid.

The pressure, and the amount of sulfur dioxide, to be used may be widely varied. Which pressure and which amount of sulfur dioxide are the most suitable may be simply determined by a few test reactions with the particular compound to be nitrated and by technical-economical factors. Conveniently, of course, atmospheric pressure and the reflux temperature of the reaction medium are employed, but lower and higher temperatures and pressures may be used without obviating the principles of the invention. Usually such an amount of liquid sulfur dioxide is employed that after completion of the nitration more than 3 moles of liquid sulfur dioxide are present per mole of nitrated compound.

Various nitrating reagents may be used in the process according to the invention. Good results can be obtained by using a mixture of nitric acid and sulfur trioxide. If a mixture of nitric acid and sulfur trioxide is used in the known nitration process, most cases will require that a solvent, such as sulfuric acid, is present in addition to the said mixture to prevent the mixture from crystallizing out in the reaction medium.

In the process according to this invention, no difficulties are presented by crystallization of nitrating reagents in the reaction medium. Thus, a mixture of nitric acid and sulfur trioxide can be used as the nitrating reagent without any special measures being required. The ratio between nitric acid and sulfur trioxide may be varied. Which ratio will give the best results may be readily determined with respect to the compound being nitrated, by a few test runs.

The process according to the invention can be carried out in various ways. That is, the aromatic compound— whether or not dissolved in liquid sulfur dioxide—can be supplied to a mixture of liquid sulfur dioxide and the nitrating reagent, or it is also possible to supply the nitrating reagent to a solution of the aromatic compound in liquid sulfur dioxide. The components of the nitrating reagent may also be supplied separately. The process may also be carried out as a continuous process, for instance, in various reactors which are connected in series.

EXAMPLES

The invention will be further understood and elucidated by consideration of the following examples, recognizing, however, that the invention is not restricted thereto.

Example 1.—Nitration of benzoic acid 40 ml. of liquid sulfur dioxide are transferred to a flask provided with a stirrer, a reflux condenser (using a mixture of carbon dioxide and acetone), and a thistle funnel. Subsequently, 12.2 g. of benzoic acid and 9 g. of liquid sulfur trioxide are introduced into the flask. Next, 6.4 g. of virtually anhydrous nitric acid are dropwise added to the mixture contained in the flask. After all of the nitric acid has been added in that way, stirring of the reaction mixture is continued for half an hour. Then, a large part of the sulfur dioxide is removed from the reaction mixture by evaporation, while the remaining part of the said mixture is poured into water, in which a precipitate is formed. After the precipitate has been filtered off, washed and dried, 15.8 g. of a virtually white, solid substance with a melting point of 133° C. are obtained. Upon recrystallization of the said substance in a mixture of alcohol and water, 14.5 g. of a solid substance with a melting point of 141° C. are obtained. The infrared-absorption spectrum and the nuclear-magnetic resonance spectrum show that this solid substance consists of completely pure metanitrobenzoic acid. Consequently, the efficiency of the conversion of benzoic acid into completely pure metanitrobenzoic acid is about 87%.

The nuclear-magnetic resonance spectrum of the solid substance with a melting point of 133° C. shows that this substance consists of 93% of metanitrobenzoic acid, about 1% of paranitrobenzoic acid and 6% of orthonitrobenzoic acid, indicating a high degree of selectivity.

Example 2.—Nitration of chlorobenzene 50 ml. of liquid sulfur dioxide are transferred to a flask provided with a stirrer, a reflux condenser (using a mixture of acetone and carbon dioxide), and a thistle funnel. Next, 9.6 g. of liquid sulfur trioxide and 6.9 g. of virtually anhydrous nitric acid are successively introduced into the flask. As a result, a suspension of solid nitrating acid in liquid sulfur dioxide will be formed. Then, 10.8 g. of chlorobenzene is dropwise added to this suspension. 1 hour after the addition of the chlorobenzene, the reaction mixture is poured into water, the resulting precipitate being filtered off, washed, and dried. From the precipitate, 15 g. of a light-yellow product with a melting point of 68° C. is obtained. The infrared-absorption spectrum of this product shows that it contains at most 10% of orthonitrochlorobenzene as by-product to the almost-exclusive formation of paranitrochlorobenzene. If it is assumed that the difference between the melting point of the nitrating product obtained and the melting point of pure paranitrochlorobenzene (82.15° C.) is caused exclusively by the presence of orthonitrochlorobenzene, it can be concluded by means of the well-known melting point diagram of the ortho and paranitrochlorobenzene system that the said nitrating product contains at least 80% of paranitrochlorobenzene.

In the nitration process as customary so far, in which no liquid sulfur dioxide is used (see P. H. Groggins, Unit Processes in Organic Chemistry, McGraw Hill, New York 1958, page 115), the para-isomer content of the nitrating product is only 67%. Consequently, this prior art nitrating product has a low melting point (52° C.).

Example 3.—Nitration of phenol 25 ml. of liquid sulfur dioxide are transferred to a reaction flask provided with a reflux condenser (using a mixture of carbon dioxide and acetone), a stirrer, and a thistle funnel. Next, 11.6 g. of liquid sulfur trioxide and 8.9 g. of virtually anhydrous nitric acid are successively introduced into the flask. As a result, a precipitate is formed. Then, 3.9 g. of phenol dissolved in 20 ml. of liquid sulfur dioxide are dropwise added to the mixture contained in the flask with simultaneous stirring. In consequence of this, a strongly exothermic reaction takes place in which the reaction mixture assumes a reddish brown color and the above-mentioned precipitate disappears. Upon addition of the phenol, stirring of the reaction mixture is continued for some time. After the stirring has been stopped, the flask contains a two-liquid-phase system. The larger part of the sulfur dioxide is contained in the upper phase. The nuclear-magnetic resonance spectrum of the said phase shows that it contains a 2,4,6-trinitro-substituted product. The two liquid phases are poured together into 150 ml. of water, as a result of which a yellow precipitate is formed. This precipitate is filtered off, washed and dried. As a result, 8.4 g. of a dried product are obtained, which chromatographic analysis consists of virtually pure picric acid. The efficiency of the formation of the product thus obtained amounts to 88%.

Example 4.—Nitration of toluene 35 ml. of liquid sulfur dioxide are transferred to a reaction flask provided with a drain cock, a reflux condenser (using a mixture of carbon dioxide and acetone), a stirrer and a thistle funnel. Next, 7.5 g. of liquid sulfur trioxide and 5.8 g. of virtually anhydrous nitric acid are successively added to the sulfur dioxide contained in the flask. As a result, a white precipitate is formed. While stirring the mixture contained in the flask, 3.8 g. of toluene is then gradually introduced via the thistle funnel. Upon addition of the toluene, stirring of the reaction mixture is continued for 1.5 hours.

After the stirrer has been stopped, the flask contains two liquid phases, the upper one of which contains the larger part of the sulfur dioxide. The two phases are separated from each other by means of the drain cock. Analysis of the bottom phase shows that this phase contains less than 2% by weight of carbon calculated to the added amount of toluene-carbon. The nuclear-magnetic resonance spectrum of the upper liquid phase shows that almost 75% by weight of the organic substance contained in this phase consists of 2,4-dinitrotoluene and less than 1% by weight of paramononitrotoluene. Since no carbon is discharged from the reaction system, the conversion of toluene into dinitrotoluene is thus virtually quantitative.

The procedures indicated in the foregoing examples may also be used with various other aromatic compounds such as for example naphthalene, phenanthrene, anthracene, thiophene, pyridine, furan, quinoline and derivatives of these compounds.

It will accordingly be appreciated that this invention essentially resides in the use of liquid sulfur dioxide as the nitrating reaction medium, and that the invention is generally useful and operative for the reactants and reaction conditions hitherto used in conventional nitrating procedures. This reaction is accordingly limited only by the spirit and scope of the following claims.

What is claimed is:

1. In processes for the preparation of nitro derivatives of benzenoid aromatic compounds by reaction of the aromatic compound with a nitrating reagent to introduce a nitrogroup bonded directly to the aromatic nucleus, the improvement consisting essentially in that the aromatic compound is brought into reaction with the nitrating reagent in a medium of liquid sulfur dioxide wherein the amount of liquid sulfur dioxide is such that after completion of the nitration reaction, more than about 3 moles of sulfur dioxide are present per mole of the said nitro derivative product.

2. The process according to claim 1, wherein the exothermic reaction heat released in the reaction is at least partly removed from the reaction medium by evaporation of said liquid sulfur dioxide.

3. The process according to claim 1 wherein a mixture of nitric acid and sulfur trioxide is used as said nitrating reagent.

4. The process according to claim 1 wherein the said aromatic compound is benzoic acid.

5. The process according to claim 1 wherein the said aromatic compound is chlorobenzene.

6. The process according to claim 1 wherein the said aromatic compound is phenol.

7. The process according to claim 1 wherein the said aromatic compound is toluene.

8. The process of claim 1 wherein the nitrating agent comprises nitric acid and at least one compound selected from the group consisting of sulfur trioxide and sulfuric acid.

References Cited

UNITED STATES PATENTS 3,272,874   9/1966   Abbott _____ 260—644

OTHER REFERENCES

Varma et al.; Am. Chem. Soc., vol. 47, pp. 143–145 (1925).

LELAND S. SEBASTIAN, *Primary Examiner*.

U.S. Cl. X.R.

260—283, 293, 329, 346.1, 622, 645, 646, 688